United States Patent [19]
Fletcher et al.

[11] 3,825,760
[45] July 23, 1974

[54] FLAME DETECTOR OPERABLE IN PRESENCE OF PROTON RADIATION

[76] Inventors: James C. Fletcher, Administrator of the National Aeronautics and Space Administration with respect to an invention of, Washington, D.C.; Dayton J. Walker; John E. Turnage; Rodney M. F. Linford, both of Bridgeton; Steve D. Cornish, St. Louis, all of Mo.

[22] Filed: Mar. 21, 1973

[21] Appl. No.: 343,308

[52] U.S. Cl. .............................. 250/372, 250/394
[51] Int. Cl. ............................................. G01t 1/16
[58] Field of Search ............ 250/252, 265, 372, 394

[56] References Cited
UNITED STATES PATENTS

| | | | |
|---|---|---|---|
| 2,785,314 | 3/1957 | Grahame | 250/265 |
| 3,420,998 | 1/1969 | Mills, Jr. | 250/265 X |
| 3,543,260 | 11/1970 | Engh | 250/372 X |
| 3,609,364 | 9/1971 | Paine et al. | 250/372 |
| 3,653,016 | 3/1972 | Cormier | 250/372 X |

*Primary Examiner*—Archie R. Borchelt
*Attorney, Agent, or Firm*—George J. Porter; L. D. Wofford, Jr.; John R. Manning

[57] ABSTRACT

A detector of ultraviolet radiation for operation in a space vehicle which orbits through high-intensity radiation areas. Two essentially identical ultraviolet sensor tubes are mounted within a shield which limits, to acceptable levels, the amount of proton radiation reaching the sensor tubes. The shield has an opening which permits ultraviolet radiation to reach one of the sensor tubes, hereafter referred to the sensing tube. However, the shield keeps ultraviolet radiation from reaching the other sensor tube, hereafter referred to as the reference tube. Both sensor tubes receive approximately the same amount of proton radiation, but the sensing tube also is able to receive ultraviolet radiation. The circuitry of the detector subtracts the output of the reference tube from the output of the sensing tube. Therefore, any portion of the output of the sensing tube which is due to proton radiation is offset by the output of the reference tube. Consequently, the output of the circuitry of the detector is proportional to the amount of ultraviolet radiation reaching the sensing tube. A delay circuit in the detector prevents false alarms by keeping statistical variations in the proton radiation sensed by the two sensor tubes from developing an output signal.

8 Claims, 3 Drawing Figures

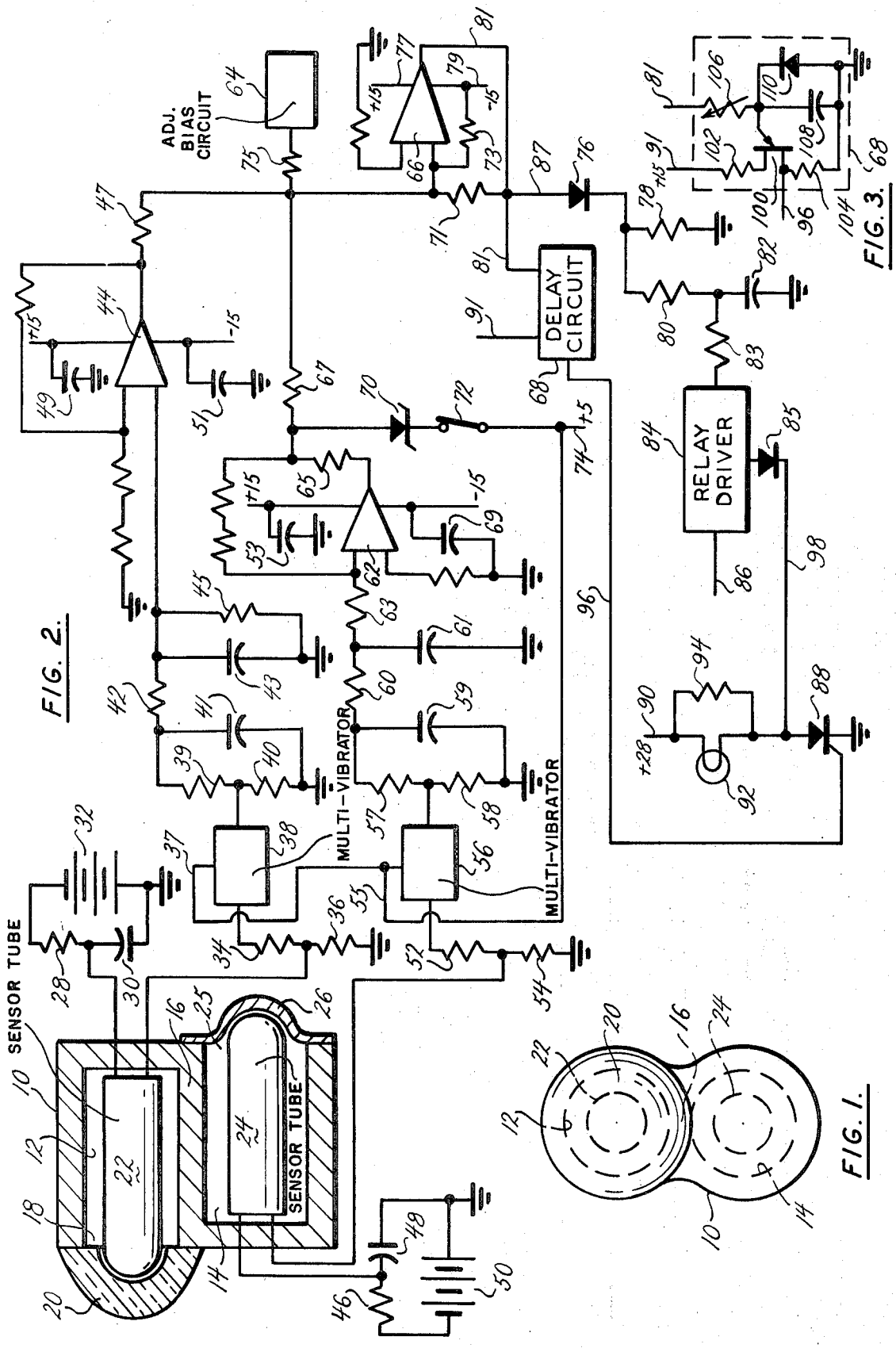

3,825,760

FLAME DETECTOR OPERABLE IN PRESENCE OF PROTON RADIATION

ORIGIN OF THE INVENTION

The invention described herein was made in the performance of work under a NASA contract and is subject to the provisions of Section 305 of the National Aeronautics and Space Act of 1958. Public Law 85-568 (72 Stat. 435; 42 U.S.C. 2457).

BACKGROUND OF THE INVENTION

1. Field of the Invention

This invention relates to detectors of one type of radiation which can be operated even when subjected to background radiation of another type.

2. Description of the Prior Art

One arrangement that was intended to compensate for background radiation utilized two sensors which were spaced apart so the amount of radiation falling on those sensors would be different and would be a measure of the background radiation. Another arrangement that was intended to compensate for background radiation initially balanced two sensors by providing a common filter for those sensors, and then subsequently enabled one of those sensors to respond to a predetermined kind of radiation by removing that filter. Circuitry has been proposed wherein parallel chains included one-shot multivibrators; and other circuitry has been proposed wherein parallel chains have included amplifiers.

SUMMARY OF THE INVENTION

The invention is a flame detector which senses ultraviolet radiation from the flame of a fire and distinguishes those radiations from proton radiations. The flame detector has a sensing tube and a reference tube which are enclosed within a radiation shield. A lens in the radiation shield permits the sensing tube to sense any ultraviolet radiation in the adjacent area. The radiation shield will permit limited, but essentially equal, amounts of proton radiation to reach both of the sensor tubes; the circuitry connected to those sensor tubes will subtract the output of the reference tube from the output of the sensing tube. In this way, the effect which proton radiation has upon the sensor tubes is cancelled; and the output of the circuitry is a measure of the ultraviolet radiator reaching the sensing tube. A delay circuit in the circuitry of the flame detector keeps statistical variations in the proton radiation sensed by the two sensor tubes from developing an output signal; and thus keeps the flame detector from giving a false alarm.

BRIEF DESCRIPTION OF THE DRAWINGS

In the drawing, FIG. 1 is an end elevational view of the shield and lens of one preferred embodiment of flame detector that is made in accordance with the principles and teachings of the present invention, FIG. 2 includes a sectional view through the shield and lens of FIG. 1 plus a diagram of the circuitry of the flame detector, and FIG. 3 is a circuit diagram of the Delay circuit of FIG. 2.

DESCRIPTION OF THE PREFERRED EMBODIMENT

Referring to the drawing in detail, the numeral 10 denotes a shield which has a generally cylindrical recess 12 and which also has a generally cylindrical recess 14 therein. The recesses are isolated from each other by a partition 16. The shield 10 is made from a material which is relatively light in weight but which has a relatively large capture cross section for electrons and protons. One such material is copper; and that material also is opaque to ultraviolet radiation. In the said one preferred embodiment of flame detector, the walls of the recesses 12 and 14 are about one-half inch thick.

The numeral 18 denotes an opening in one end of the shield 10; and that opening is in register with, and communicates with, the recess 12. The numeral 20 denotes a lens which overlies and closes the opening 18; and that lens is generally semispherical to enable it to accept ultraviolet radiation within a viewing cone that has an angle of generation in excess of sixty degrees. That lens is preferably made from an ultraviolet grade of quartz; and thus will readily transmit ultraviolet radiation into the recess 12.

The numeral 22 denotes the sensing tube of the flame detector of the present invention; and that tube is disposed within the recess 12 in the shield 10. The numeral 24 denotes the reference tube of that flame detector; and that tube is within the recess 14 in that shield. Potting material, not shown, of a resilient nature surrounds the sensor tubes 22 and 24 and fills the recesses 12 and 14. The sensor tubes 22 and 24 will preferably be essentially identical; and they will preferably have a high degree of sensitivity to radiation in the ultraviolet range. In the said one preferred embodiment of flame detector, the sensor tubes 22 and 24 are photo-emissive tubes of the avalanche type which are made by Honeywell, Inc. Although Photo-emissive tubes of the avalanche type of other manufacturers could be used, the photo-emissive tubes of the avalanche type of Honeywell, Inc., are preferred because they are very sensitive to ultraviolet radiation. The sensing tube 22 is mounted so it is in register with the opening 18, and thus will receive ultraviolet radiation passing through the lens 20. The partition 16 will isolate the reference tube 24 from all ultraviolet radiation which enters the recess 12 through the lens 20 and the opening 18.

Where the flame detector provided by the present invention is to be mounted within a vehicle that is to be orbited about the earth, the weight of that flame detector must be kept to a minimum. As a result, the shield 10 cannot be made thick enough to effectively absorb all of the protons which will impinge upon it as the vehicle passes through the high-intensity radiation areas which are known to exist in space. One such high-intensity radiation area is the South Atlantic anomaly. This means that higher energy protons from those high-intensity radiation areas will be able to pass through the wall of the shield 10, to enter the recesses 12 and 14, and to reach the sensor tubes 22 and 24. Some of the protons from the high-intensity radiation areas also will pass through the lens 20 and the opening 18, will enter the recess 12, and will reach sensing tube 22. The shield 10 has an opening 25 in the opposite end thereof; and that opening is in register with, and communicating with, the recess 14. A generally spherical metal cover 26 has the peripheral flange thereof secured to that opposite end of the shield 10; and that metal cover and its peripheral flange overlie and close the opening 25.

That metal cover and its peripheral flange preferably have the same capture cross section for protons as the lens 20. The sensing tube 22 has the sensing end thereof extending into a recess in the inner surface of the lens 20; and the reference tube 24 has the sensing end thereof extending into a recess in the inner surface of the metal cover 26. Consequently, as the vehicle passes through the high-intensity radiation areas which are known to exist in space, the amount of proton radiation that reaches the reference tube 24 will be essentially the same as the amount of proton radiation that reaches the sensing tube 22. In addition, any ultraviolet radiation within the viewing cone of the lens 20 will pass through that lens and the opening 18 and reach the sensing tube 22.

The cathode of the sensing tube 22 is connected to the junction of a resistor 28 and the negative terminal of a capacitor 30; and the other terminal of that resistor is connected to the negative terminal of a source 32 of D.C. power, while the positive terminal of that capacitor is connected to the grounded positive terminal of that source of D.C. power. The anode of the sensing tube 22 is connected to the junction of resistors 34 and 36; and the other terminal of the resistor 36 is grounded, while the other terminal of the resistor 34 is connected to the input terminal of a One-Shot Multivibrator 38. A conductor 37 supplies a regulated positive five volts to that One-Shot Multivibrator. The output terminal of that One-Shot Multivibrator is connected to the junction of resistors 39 and 40; and the other terminal of resistor 40 is connected to ground and to the negative terminal of a capacitor 41. The other terminal of resistor 39 is connected to the positive terminal of capacitor 41 and to one terminal of a resistor 42. The other terminal of resistor 42 is connected to the positive terminal of a capacitor 43, to one terminal of a resistor 45 and to pin 3 of an Amplifier 44. The negative terminal of capacitor 43 and the other terminal of resistor 45 are connected to ground. The resistors 39, 40 and 42 and the capacitors 41 and 43 will coact to serve as a filter, and they will respond to changes of state at the output terminal of the One-Shot Multivibrator 38 to develop a low-level analog signal. The amplifier 44 has a feed back resistor connected from the output pin 6 thereof to the input pin 2 thereof; and it has that input pin connected to ground by two series-connected resistors. A filter capacitor 49 is connected between ground and a conductor which supplies positive fifteen volts to pin 7 of Amplifier 44; and a filter capacitor 51 is connected between ground and a conductor which supplies negative fifteen volts to pin 4 of that Amplifier. In the said one preferred embodiment of flame detector, the value of resistor 28 is 2 meg. ohms, the value of capacitor 30 is 33 picofarads, the output voltage of the source 32 is 350 volts, the value of resistor 34 is 6.8 K ohms, and the value of resistor 36 is 1.1 K ohms. Further, the value of resistor 39 is 7.15 K ohms, the value of resistor 40 is 30 K ohms, the value of resistor 42 is 13.3 K ohms, the value of resistor 45 is 14.7 K ohms, the value of the each of capacitors 41 and 43 is 15 microfarads, the value of the feedback resistor for the Amplifier 44 is 90.9 K ohms, and the value of one of the series-connected resistors between the pin 2 and that Amplifier and ground is 16.2 K ohms, while the value of the other of those resistors will be selected to provide the desired gain for that Amplifier.

The cathode of the reference tube 24 is connected to the junction of a resistor 46 and the negative terminal of a capacitor 48; and the other terminal of that resistor is connected to the negative terminal of a source 50 of D.C. power, while the positive terminal of that capacitor is connected to the grounded positive terminal of that source of D.C. power. The anode of the reference tube 24 is connected to the junction of resistors 52 and 54; and the other terminal of resistor 54 is grounded, while the other terminal of resistor 52 is connected to the input terminal of a One-Shot Multivibrator 56. A conductor 55 supplies a regulated positive five volts to that One-Shot Multivibrator. The output terminal of that One-Shot Multivibrator is connected to the junction of resistors 57 and 58; and the other terminal of resistor 58 is connected to ground and to the negative terminal of a capacitor 59. The other terminal of resistor 57 is connected to the positive terminal of capacitor 59 and to one terminal of a resistor 60. The other terminal of resistor 60 is connected to the positive terminal of a capacitor 61 and to one terminal of a resistor 63. The negative terminal of capacitor 61 is grounded, and the other terminal of resistor 63 is connected to input pin 2 of an Amplifier 62. The resistors 57, 58 and 60 and the capacitors 59 and 61 will coact to serve as a filter; and they will respond to changes of state at the output terminal of the One-Shot Multivibrator 56 to develop a low-level analog signal. Pin 3 of Amplifier 62 is connected to ground by a resistor; and the output pin 6 of that Amplifier is connected to the input pin 2 by a resistor 65 and by two series-connected resistors. A filter capacitor 53 is connected between ground and a conductor which supplies positive 15 volts to pin 7 of Amplifier 62; and a filter capacitor 69 is connected between ground and a conductor which supplies negative 15 volts to pin 4 of that Amplifier.

In the said one preferred embodiment of flame detector, the value of resistor 46 is 2 meg. Ohms, the value of capacitor 48 is 33 microfarads, the output voltage of the source 50 is 350 volts, the value of resistor 52 is 6.8 K ohms, and the value of resistor 54 is 1.1 K ohms. Further, the value of resistor 57 is 7.15 K ohms, the value of resistor 58 is 30 K ohms, the value of resistor 60 is 13.3 K ohms, the value of resistor 63 is 14.7 K ohms, and the value of each of capicitors 59 and 61 is 15 microfarads. The value of the resistor which is connected between pin 3 of Amplifier 62 and ground is 24 K ohms, the value of resistor 65 is 1.1 K ohms, and the value of one of the series-connected resistors between the upper terminal of resistor 65 and pin 2 of Amplifier 62 is 86.6 K ohms, while the value of the other of those resistors will be selected to provide the desired gain for that Amplifier.

A Zener diode 70 has the anode thereof connected to the terminal of resistor 65 which is connected to input pin 2 of Amplifier 62 by the two series-connected resistors; and the cathode of that Zener diode is connected to a source of regulated positive five volts by normally closed contacts 72 and a conductor 74. Conductors 37 and 55 are shown connected to the source of regulated positive five volts by being connected to the conductor 74.

An Adjustable Bias Circuit 64 has the output terminal thereof connected to input pin 3 of a Summing Circuit 66 by a resistor 75. The Amplifier 44 has its output pin 6 connected to that input pin by a resistor 47, and the Amplifier 62 has its output pin 6 connected to that input pin by a resistor 67. The value of each of resistors 47 and 67 is 8.25 K ohms, and the value of resistor 75 is 28.7 K ohms. The Summing Circuit 66 has a 3.3 K ohm resistor connected between its pin 2 and ground; and it has a 10 meg. ohm feedback resistor 71 connected between its output pin 6 and its input pin 3. That Summing Circuit also has a 90.9 K ohm resistor 73 connected between its pin 4 and its pin 3. A conductor 77 connects a further input of the Summing Circuit 66 to a source of positive 15 volts, while a conductor 79 connects pin 4 of that Summing Circuit to a source of negative 15 volts.

The output pin 6 of the Summing Circuit 66 is connected to one input terminal of a Delay Circuit 68 by a conductor 81, and is connected to the anode of a diode 76 by conductor 81 and a conductor 87. A second input of that Delay Circuit is connected to a source of positive 15 volts by a conductor 91. The output terminal of that Delay Circuit is connected to the gate of a silicon controlled rectifier 88 by a conductor 96. The cathode of that silicon controlled rectifier is connected to ground; and the anode of that silicon controlled rectifier is connected to one terminal of an incandescent lamp 92 and to one terminal of a resistor 94. The other terminals of that incandescent lamp and resistor are connected to a source of positive 28 volts D.C. by a conductor 90. The cathode of diode 76 is connected to one terminal of a resistor 78 and one terminal of a resistor 80. The other terminal of resistor 78 is connected to ground, while the other terminal of resistor 80 is connected to the positive terminal of a capacitor 82 and to one terminal of a resistor 83 which is connected to the input terminal of a Relay Driver 84. The negative terminal of capacitor 82 is connected to ground; and the output terminal of Relay Driver 84 is connected to a caution and warning unit, not shown, by a conductor 86. A second input of the Relay Driver 84 is connected to the anode of a diode 85; and the cathode of that diode is connected to the anode of the silicon controlled rectifier 88 by a conductor 98. The value of resistor 78 is 51 K ohms, the value of resistor 80 is 3.3 K ohms, the value of capacitor 82 is 6.8 microfarads, and the value of resistor 83 is 6.8 K ohms.

The One-Shot Multivibrators 38 and 56 can be of standard and usual design; but each of them should produce output pulses of calibrated heights and widths. Further, each output pulse from the One-Shot Multivibrator 38 should have the same height and width that each output pulse from the One-Shot Multivibrator 56 has. In the said one preferred embodiment of flame detector, each of the One-Shot Multivibrators is a 9601 of the Fairchild Semiconductor Products Division. The Adjustable Bias Circuit 64 can be of standard and usual design, and it will usually include a good quality potentiometer. The Amplifiers 44 and 62 can be of standard and usual design; and, in the said one preferred embodiment of flame detector, each of those Amplifiers is a $\mu a$ 741 of the Fairchild Semiconductor Products Division. The Amplifier 44 is connected to operate in the non-inverting mode, but the Amplifier 62 is connected to operate in the inverting mode; and hence the Summing Circuit 66 can subtract the output of Amplifier 62 from the output of Amplifier 44 by a summing operation. That Summing Circuit can be of standard and usual design; and, in the said one preferred embodiment of flame detector, that Summing Circuit is a $\mu a$ 741 of the Fairchild Semiconductor Products Division. The voltage at the output pin 6 of the Summing Circuit 66 is about negative 12 volts whenever the ultraviolet radiation, that reaches the sensing tube 22, is below the threshold value of the flame detector; but that voltage goes to about positive 12 volts when that ultraviolet radiation exceeds that threshold value and is sensed by that sensing tube.

The Delay Circuit 68 includes a unijunction transistor 100, a resistor 102 which connects conductor 91 to the base-two of that unijunction transistor, a resistor 104 which connects the base-one of that unijunction transistor to ground, a capacitor 108 which is connected between the emitter of that unijunction transistor and ground, a diode 110 which has the anode thereof connected to ground, and an adjustable resistor 106 which connects conductor 81 to that emitter and to the positive terminal of that capacitor and to the cathode of that diode. The conductor 96 is connected to the base one of the unijunction transistor 100. That unijunction transistor, the resistors 102, 104 and 106, and the capacitor 108 are of standard and usual design and value. The diode 110, which is a standard commercially available diode, is connected in parallel relation with the capacitor 108 to perform two functions. First, that diode allows that capacitor to discharge rapidly when the level of ultraviolet radiation, that reaches the sensing tube 22, has been above the threshold value of the flame detector and then falls below that value. Second, that diode prevents the development of a substantial reverse voltage across the capacitor 108 when the voltage at the pin 6 of the Summing Circuit 66 is about negative twelve volts. The adjustable resistor 106 enables the Delay Circuit 68 to provide a settable delay which will keep the circuitry of FIG. 2 from developing a signal at the output of that Delay Circuit, and hence at the gate of silicon controlled rectifier 88, until a predetermined amount of ultraviolet radiation reaches the sensing tube 22 for a predetermined length of time.

The Relay Driver 84 can be of standard and usual design; and it will preferably include a transistor which has the emitter thereof connected to the conductor 98 by the diode 85. As long as the silicon controlled rectifier 88 is non-conductive, that Relay Driver will not only apply a signal to the conductor 86; but, as soon as that silicon controlled rectifier becomes conductive, that Relay Driver will apply a signal to that conductor. The diode 76, resistors 78 and 80 and capacitor 82 constitute a storage circuit; and that circuit will respond to a signal at the output pin 6 of the Summing Circuit 66 to develop, and to maintain for a short period of time after that output signal subsides, a signal at the input of the Relay Driver 84.

The incandescent lamp 92 will remain dark as long as the silicon controlled rectifier 88 remains non-conductive; but that incandescent lamp will become illuminated as soon as that silicon controlled rectifier becomes conductive. The resistor 94 has a value which is high enough to cause sufficient current to flow through the incandescent lamp 92 to illuminate that incandescent lamp whenever the silicon controlled rectifier 88 is conductive; but the value of that resistor is low enough to permit that silicon controlled rectifier to become conductive even if that incandescent lamp "burns out." The incandescent lamp 92 is intended to serve as a caution and warning lamp, and thus is redundant to the caution and warning unit, not shown; and that caution and warning unit will provide a signal even if that incandescent lamp is "burned out."

During any period when essentially no proton radiation reaches either of the sensor tubes 22 and 24 and essentially no ultraviolet radiation reaches the sensing tube 22, virtually no electron current will flow from the negative terminal of the D.C. source 32 via resistor 28, the cathode-anode circuit of sensing tube 22, and resistor 36 to ground. Similarly, virtually no electron current will flow from the negative terminal of the D.C. source 50 via resistor 46, the cathode-anode circuit of reference tube 24, and resistor 54 to ground. Consequently, ground voltage will normally be applied to the input terminals of the One-Shot Multivibrators 38 and 56. However, even if appreciable amounts of leakage current were to flow from the negative terminal of the D.C. source 32 via resistor 28, the cathode-anode circuit of sensing tube 22 and resistor 36 to ground, the One-Shot Multivibrator 38 would not produce a change of state at the output pin 8 thereof; because that One-Shot Multivibrator will not produce a change of state at that output pin until a "zero" to minus "one" signal is applied to the input terminal thereof. Similarly, even if appreciable amounts of electron current were to flow from the negative terminal of the D.C. source 50 via resistor 46, the cathode-anode circuit of reference tube 24 and resistor 54 to ground, the One-Shot Multivibrator 56 would not produce a change of state at the output pin 8 thereof; because that One-Shot Multivibrator will not produce a change of state at that output pin until a "zero" to minus "one" signal is applied to the input terminal thereof.

The D.C. source 32 will establish a voltage across the capacitor 30, and thus across the series-connected cathode-anode circuit of sensing tube 22 and resistor 36, which is slightly less than the breakdown voltage of that cathode-anode circuit. Similarly, the D.C. source 50 will establish a voltage across the capacitor 48, and thus across the series-connected cathode-anode circuit of reference tube 24 and resistor 54, which is slightly less than the breakdown voltage of that cathode-anode circuit. As a result, in the normal standby condition of the circuitry of the flame detector, both the sensor tubes 22 and 24 will be in a non-conducting state; and hence the circuitry of the flame detector will not develop a signal at the pin 6 of the Summing Circuit 66. The incandescent lamp 92 and the resistor 94 will apply a voltage to the anode of the silicon controlled rectifier 88; but that silicon controlled rectifier will be non-conductive because it does not have a signal at the gate thereof. Consequently, the incandescent lamp 92 will be dark, and the Relay Driver 84 will not be applying a signal to the conductor 86.

If the vehicle on which the flame detector is mounted passes through a high-intensity radiation area, protons will pass inwardly through the walls of the shield 10, will enter the recesses 12 and 14, and will impinge upon the sensor tubes 22 and 24. In addition, some proton radiation will pass inwardly through the lens 20, and some further proton radiation will pass inwardly through the metal cover 26. Although the lens 20 is at one end of the shield 10, while the metal cover 26 is at the other end of that shield, substantially the same amounts of proton radiation will pass through that lens and through that metal cover. In part this is due to the inherent characteristics and nature of proton radiation in high-intensity radiation areas, and in part it is due to the scattering effect which adjacent metal portions of the vehicle will have upon the proton radiation.

If proton radiation penetrates the shield 10 and passes between the electrodes of the sensor tubes 22 and 24, the gases within those sensor tubes will ionize and enable both of those sensor tubes to "break down." Thereupon, the capacitor 30 will discharge via the cathode-anode circuit of the sensing tube 22 and resistor 36 to ground; and, similarly, the capacitor 48 will discharge via the cathode-anode circuit of the reference tube 24 and resistor 54 to ground. As those capacitors discharge, the voltage at the input of the One-Shot Multivibrator 38 will change from zero to minus one; and, similarly, the voltage at the input of the One-Shot Multivibrator 56 will change from zero to minus one. Thereupon, the One-Shot Multivibrator 38 will momentarily change the state of the output thereof; and, similarly, the One-Shot Multivibrator 56 will momentarily change the state of the output thereof. Also, as the capacitor 30 discharges, the voltage across the cathode-anode circuit of the sensing tube 22 will fall below the value at which ionization can be sustained; and, thereupon, conduction of current through that sensing tube will stop. Similarly, as the capacitor 48 discharges, the voltage across the cathode-anode circuit of the reference tube 24 will fall below the value at which ionization can be sustained; and, thereupon, conduction of current through that reference tube will stop. The D.C. sources 32 and 50 will immediately start re-charging the capacitors 30 and 48, respectively; and, if proton radiation continues to reach the sensor tubes 22 and 24, those sensor tubes will again "break down" as the voltages across the capacitors 30 and 48 rise above the minimum levels at which the gases within those sensor tubes can ionize. As long as the vehicle, in which the flame detector is mounted, remains in the high-intensity radiation area, the sensor tubes 22 and 24 will recurrently "break down" and then become non-conductive.

The recurrent changes of state at the output pin 8 of the One-Shot Multivibrator 38, which will result from the recurrent "breakdowns" of the sensing tube 22, will constitute pulses that will be integrated by resistors 39, 40 and 42 and capacitors 41 and 43 to develop a low level D.C. voltage. The Amplifier 44 will respond to that voltage to apply an amplified positive D.C. voltage to input pin 3 of the Summing Circuit 66 via resistor 47. Similarly, the recurrent changes of state at the output pin 8 of the One-Shot Multivibrator 56, which will result from the recurrent "breakdowns" of the reference tube 24, will constitute pulses that will be integrated by resistors 57, 58 and 60 and capacitors 59 and 61 to develop a low level D.C. voltage. The Amplifier 62 will respond to that voltage to apply an amplified negative D.C. voltage to input pin 3 of the Summing Circuit 66 via resistor 67. Simultaneously, the Adjustable Bias Circuit 64 will apply a bias to input pin 3 of the Summing Circuit 66 via resistor 75. Although the output of the Adjustable Bias Circuit 64 is positive, the negative voltage which is applied to the resistor 73 by the conductor 79 normally causes the resistors 75 and 73 to apply a negative voltage to the input pin 3 of the Summing Circuit 66. Adjustment of the Adjustable Bias Circuit 66 will determine the value of the positive voltage which the Amplifier 44 must develop, or of the net positive voltage which the Amplifiers 44 and 62 must develop, to cause the Summing Circuit 66 to supply a signal to the Delay Circuit 68.

Because the D.C. voltage which the Amplifier 44 applies to input pin 3 of the Summing Circuit 66 is of one polarity while the D.C. voltage which the Amplifier 62 applies to that input pin is of opposite polarity, the summing action of that Summing Circuit will actually subtract the output of Amplifier 62 from the output of Amplifier 44. Also, because the shield 10 makes certain that the proton radiation which reaches the sensing tube 22 is effectively the same as the proton radiation which reaches the reference tube 24, the net output from the Summing Circuit 66, which is due to proton radiation, is zero. Consequently, as long as the only radiation that reaches either of the sensor tubes 22 and 24 is proton radiation, the Summing Circuit 66 will not develop a signal at the output pin 6 thereof.

The rate at which the sensor tubes 22 and 24 recurrently "break down" and then become non-conductive is a function of the values of resistors 28, 36, 46 and 54, of the values of capacitors 30 and 48, and of the amounts of radiation reaching those sensor tubes. The higher the intensity of the radiation which reaches those sensor tubes, the higher the rate at which those sensor tubes will recurrently "break down" and then become non-conductive, and also the higher the D.C. voltages that will appear at the output pins 6 of the Amplifiers 44 and 62. In the said one preferred embodiment of flame detector, the maximum anticipated proton radiation that will reach either of the sensor tubes 22 and 24 will cause those sensor tubes to recurrently "break down" and then become non-conductive at rates of less than 200 times per second; and when those sensor tubes are "breaking down" and then becoming non-conductive at rates close to 200 times per second, the voltage at the output pin 6 of Amplifier 44 will be about three volts and the voltage at the output pin 6 of the Amplifier 62 will be about −3 volts. However, regardless of the voltages at the output pins 6 of the Amplifiers 44 and 62 as long as the only radiation that reaches either of the sensor tubes 22 and 24 is proton radiation, the Summing Circuit 66 will receive substantially equal but oppositely-polarized D.C. voltages from the Amplifiers 44 and 62, and thus will not develop a signal at the output pin 6 thereof.

In the event ultraviolet radiation passes through the lens 20 into the recess 12, the sensing tube 22 will repeatedly "break down" and then become non-conductive. The rate at which that sensing tube "breaks down" and then becomes non-conductive is a function of the values of resistors 28 and 36, of the value of capacitor 30, and of the amount of ultraviolet radiation which reaches that sensing tube. The One-Shot Multivibrator 38 will coact with resistors 39, 40 and 42 and capacitors 41 and 43 and with the Amplifier 44 to apply a D.C. voltage to input pin 3 of the Summing Circuit 66. The reference tube 24 will not be able to cause the One-Shot Multivibrator 56 to coact with resistors 57, 58 and 60 and capacitors 59 and 61 and with the Amplifier 62 to apply a D.C. voltage to that input pin of that Summing Circuit, because that reference tube is shielded from all ultraviolet radiation. If the ultraviolet radiation which reaches sensing tube 22 is of sufficient intensity to make the D.C. voltage at the output pin 6 of Amplifier 44 higher than the opposite polarity D.C. voltage provided by the Adjustable Bias Circuit 64 and the resistor 73, the Summing Circuit 66 will apply a positive D.C. voltage to the anode of diode 76. The resulting voltage will charge the capacitor 82; and thus will provide sufficient energy storage to cause the Relay Driver 84 to conduct for a short time after the output of summing amplifier 66 has subsided, provided the silicon controlled rectifier 88 becomes conductive. In the preferred embodiment of flame detector, the capacitor 82 will store enough energy to cause the Relay Driver 84 to continue to conduct for a few tenths of a second after that silicon controlled rectifier becomes conductive, and thereby makes certain that any illumination of the incandescent lamp 92 is accompanied by an actuation of the caution and warning unit.

Although the Delay Circuit 68 will immediately sense the positive D.C. voltage at the output pin 6 of the Summing Circuit 66, that Delay Circuit will not apply a signal to the gate of the silicon controlled rectifier 88 unless and until that D.C. voltage has been maintained for a predetermined length of time. In the said one preferred embodiment of flame detector, the Delay Circuit 68 provides a delay of less than one second —to such a delay being long enough to keep any statistical variations in the proton radiation reaching the sensor tubes 22 and 24 from causing the flame detector to provide a false alarm, and yet being short enough to provide a prompt indication of the presence of a flame. This means that if a flame, within the viewing cone of the lens 20, persists for as much as a second, the Delay Circuit 68 will apply a signal to the gate of the silicon controlled rectifier 88; and that signal will render that silicon controlled rectifier conductive. Thereupon the incandescent lamp 92 will become illuminated to provide a visual indication of the presence of a flame; and the transistor in the Relay Driver 84 will respond to the grounding of the emitter thereof, when the silicon controlled rectifier 88 becomes conductive, to cause that Relay Driver to actuate the caution and warning unit which will provide visual, audible and telemetered indications of the presence of a flame.

If, as pointed out hereinbefore, the incandescent lamp 92 had "burned out", the resistor 94 would permit enough current to flow through the silicon controlled rectifier 88 to render that silicon controlled rectifier conductive and to keep that silicon controlled rectifier conductive. Also, because the caution and warning unit would provide a visual indication, as well as an audible and telemetered indication, adequate notification of the presence of a flame would be provided. Once the silicon controlled rectifier 88 had been rendered conductive, it would remain conductive until the power to the circuitry of FIG. 2 was interrupted; and hence that circuitry would continue to provide notification of the presence of a flame until that power was interrupted.

In the event ultraviolet radiation passes through the lens 20 and impinges upon the sensing tube 22 at a time when the flame detector is passing through a high-intensity radiation area in space, that sensor tube will be receiving proton radiation as well as ultraviolet radiation; and hence it will "break down" and then subsequently become non-conductive at a more rapid rate than it would if it was receiving only ultraviolet radiation. Because the reference tube 24 will be receiving only proton radiation, it will "break down" and then subsequently become non-conductive at a lesser rate. Consequently, the One-Shot Multivibrator 38 will receive triggering pulses at a more rapid rate than will the One-Shot Multivibrator 56; and hence the One-Shot Multivibrator 38 will coact with resistors 39, 40 and 42 and with capacitors 41 and 43 and with Amplifier 44 to apply a higher D.C. voltage to the input pin 3 of Summing Circuit 66 than will One-Shot Multivibrator 56, resistors 57, 58 and 60, capacitors 59 and 61, and Amplifier 62. If the level of the ultraviolet radiation is sufficiently high, the difference between the D.C. voltages at the output pins 6 of the Amplifiers 44 and 62 will exceed the D.C. voltage provided by the Adjustable Bias Circuit 64 and by the resistor 73, and the Summing Circuit 66 will apply a positive D.C. voltage to the Delay Circuit 68 and to the anode of diode 76, all as described hereinbefore. If the intensity of the ultraviolet radiation remains at, or increases above, that level, for an appreciable portion of a second, that Delay Circuit will apply a signal to the gate of silicon controlled rectifier 88 which will render that silicon controlled rectifier conductive, with consequent illumination of incandescent lamp 92 and with consequent actuation of the caution and warning unit.

As pointed out hereinbefore, the Summing Circuit 66 must maintain a D.C. voltage of a predetermined value at the input of the Delay Circuit 68 for a substantial part of a second before that Delay Circuit will apply a signal to the gate of the silicon controlled rectifier 88. This is desirable; because it essentially eliminates all probability of false alarms which otherwise could be given because of statistical variations in the proton radiation that can reach the sensor tubes 22 and 24. The storage circuit, which consists of diode 76, of resistors 78 and 80, and of capacitor 82, will maintain the input of the Relay Driver 84 for a period of time that is slightly longer than the time which is needed to actuate the caution and warning unit; and hence that storage circuit will be able to cause the Relay Driver 84 to actuate the caution and warning unit when the Delay Circuit renders the silicon controlled rectifier 88 conductive, even if the output of the Summing Circuit 66 happens to disappear as the silicon controlled rectifier 88 becomes conductive.

The amount of ultraviolet radiation that occurs during any given combustion is a function of the nature and size of the combustible material and of the environment; and the sensitivity of the flame detector is controlled by the setting of the Adjustable Bias Circuit 64. The said one preferred embodiment of flame detector can be set so it will render the silicon controlled rectifier 88 conductive if even a small flame, comparable to or slightly larger than the flame provided by a match, develops within the viewing cone of the lens 22 and within ten feet of that lens. In addition, because the Summing Circuit 66 effectively cancels and offsets the signals which are due to proton radiation, that flame detector retains its ability to sense such a small flame, even when that flame detector is caused to pass through high-intensity radiation areas. Further, that flame detector will not render the silicon controlled rectifier 88 conductive when only proton radiation is reaching the sensing tube 22 —to regardless of the intensity of the high-intensity radiation areas through which that flame detector is caused to pass; because the Summing Circuit 66 will effectively cancel the D.C. voltages from the Amplifiers 44 and 62 which are due to proton radiation. Moreover, that flame detector will be able to sense and respond to ultraviolet radiation from a flame, even when that flame detector is caused to pass through high-intensity radiation areas; because the shield 10 will keep the intensity of the proton radiation which reaches the sensor tubes 22 and 24 well below the saturation level of either of those sensor tubes.

The D.C. source 32, the resistor 28, the capacitor 30, the sensing tube 22, and the resistor 36 constitute components of a relaxation oscillator which is intended to, and which can, be triggered either by ultraviolet radiation or by proton radiation or by various combinations of ultraviolet radiation and proton radiation; and the values of those components are such that the sensing tube 22 could "break down" and then become non-conductive at a maximum rate of 500 times a second. However, in the said preferred embodiment of flame detector, the shield 10 will limit the amount of proton radiation which can reach the sensing tube 22 to a level which can not cause that sensing tube to "break down" and then become non-conductive at a rate in excess of 200 times a second. This is desirable; because it permits the sensing tube 22 to respond to ultraviolet radiation of varying intensities to "break down" and then become non-conductive at rates up to 300 times a second above the 200 per second rate at which that sensing tube can "break down" and then become non-conductive in a maximum proton environment.

The D.C. source 50, the resistor 46, the capacitor 48, the reference tube 24, and the resistor 54 constitute components of a relaxation oscillator which is intended to, and which can, be triggered by proton radiation; and the values of those components are such that the reference tube 24 could "break down" and then become non-conductive at a maximum rate of 500 times a second. However, in the said preferred embodiment of flame detector, the shield 10 will limit the amount of proton radiation which can reach the reference tube 24 to a level which can not cause that reference tube to "break down" and then become nonconductive at a rate in excess of 200 times a second. This is desirable; because it limits the negative voltage which any given level of proton radiation can cause the reference tube 24, the One-Shot Multivibrator 56, and the Amplifier 62 to develop at the output pin 6 of that Amplifier to less than 3 volts, and thus makes is possible for the sensing tube 22 to respond to ultraviolet radiation plus that same level of proton radiation to cause the One-Shot Multivibrator 38 and the Amplifier 44 to develop a higher positive voltage at the output pin 6 of that Amplifier. In addition, the contacts 72 and the Zener diode 70 will keep the negative voltage at the output pin 6 of the Amplifier 62 from exceeding three volts, even if the reference tube 24 happens to become defective; and thus make it possible for the flame detector to sense ultraviolet radiation even if that reference tube happens to become defective.

More particularly, if the flame detector were not equipped with the contacts 72 and the Zener diode 70, and if the reference tube 24 were to become effective and were to coact with the other components of the relaxation oscillator of which it is a part to "break down" repeatedly — when no proton radiation was present — that relaxation oscillator and the One-Shot Multivibrator 56 and the integrator connected to the output pin of that One-Shot Multivibrator could cause the Amplifier 62 to apply a negative voltage to the input pin 3 of the Summing Circuit 66 which could equal or exceed the positive voltage which the sensing tube 22, the One-Shot Multivibrator 38 and the integrator circuit connected to the output of that One-Shot Multivibrator were causing the Amplifier 44 to apply to that input pin. In such event, the flame detector would be unable to render the silicon controlled rectifier 88 conductive even though the sensing tube 22 was receiving intensive ultraviolet radiation and was coacting with the One-Shot Multivibrator 38 and the Amplifier 44 to develop a substantial positive voltage at the output pin 6 of that Amplifier. However, because the flame detector of the present invention is equipped with the contacts 72 and the Zener diode 70, the negative voltage at the output pin 6 of the Amplifier 62 can not exceed three volts; and the sensing tube 22 can respond to ultraviolet radiation to cause the One-Shot Multivibrator 38 and the Amplifier 44 to develop a positive voltage at the output pin 6 of that amplifier which is greater than the sum of 3 volts plus the voltage developed by the resistor 73 and the Adjustable Bias Circuit 64. Specifically the Zener diode 70 has positive 5 volts applied to the cathode thereof by conductor 74, and that Zener diode has a Zener voltage of about 8 volts; and hence as long as the voltage at the junction of resistors 65 and 67 is not more negative than 3 volts, that Zener voltage will not be exceeded, and no current will flow through that Zener diode. However, if the voltage at the junction of resistors 65 and 67 ever became more negative than 3 volts — as it could if the reference tube 24 were to become defective and were to coact with the other components of the relaxation oscillator of which it is a part to "break down" repeatedly, the voltage drop across the Zener diode 70 would exceed the Zener voltage of that Zener diode; and, thereupon, that Zener diode would conduct current and would effectively clamp the voltage at the junction of resistors 65 and 67 at a value no more negative than 3 volts.

The negative voltage at the junction of resistors 65 and 67 will not exceed three volts as long as the reference tube 24 is free of defects; and that negative voltage will be a function of the proton radiation to which that reference tube is subjected. Because the sensing tube 22 will always receive the same proton radiation that is received by the reference tube 24, and because the sensing tube 22 may also receive ultraviolet radiation, the positive voltage at the output pin 6 of the Amplifier 44 will equal or exceed the voltage at the output pin of Amplifier 62, as long as the reference tube 24 is free of defects. Importantly, even if that reference tube were to become defective and were to cause the Amplifier 62 to tend to develop a negative voltage at the output pin 6 thereof which was greater than 3 volts, the Zener diode 70 would keep that voltage from exceeding that value. Such a voltage is small enough to enable the sensing tube 22 to respond to ultraviolet radiation to cause the One-Shot Multivibrator 38 and the integrator connected to the output of that One-Shot Multivibrator and the Amplifier 44 to apply a signal to the input pin 3 of the Summing Circuit 66 which will enable that Summing Circuit to apply an actuating signal to the anode of diode 76 and to the input terminal of Delay Circuit 68. In this way, the flame detector of the present invention is able to cancel and offset signals due to the anticipated maximum intensity of proton radiation, and also is able to respond to ultraviolet radiation even if the reference tube 24 happens to become defective and "breaks down" at rates in excess of 200 times a second.

The normally closed contacts 72 can be opened to isolate the Zener diode 70 from the source of positive five volts that normally is connected to the cathode thereof. Those contacts will usually be opened when the various components of the flame detector are being checked.

Whereas the drawing and accompanying description have shown and described a preferred embodiment of the present invention it should be apparent to those skilled in the art that various changes may be made in the form of the invention without affecting the scope thereof.

What we claim is:

1. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said second type of radiation includes proton radiation, and wherein said first sensor and said second sensor have substantially equal responses to said proton radiation.

2. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said second type of radiation includes proton radiation, and wherein said shielding limits the amount of said second type of radiation which can reach said first sensor to a value which enables said first sensor to simultaneously sense said predetermined type of radiation.

3. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said shielding has an opening therein in register with said first sensor that permits said predetermined type of radiation to reach said first sensor and that also permits some of said second type of radiation to reach said first sensor, wherein said shielding has a second opening therein in register with said second sensor that permits some of said second type of radiation to reach said second sensor, wherein a cover closes said second opening, and wherein said cover is dimensioned to cause the amount of said second type of radiation which reaches said second sensor to be approximately the same as the amount of said second type of radiation which reaches said first sensor through the first said opening.

4. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said shielding has a recess therein in which said first sensor is located, wherein said shielding has a second recess therein in which said second sensor is located, wherein said shielding has a barrier between the first said and said second recesses that keeps said predetermined type of radiation which is permitted to reach said first sensor from also reaching said second sensor, wherein said shielding has an opening at one end thereof that communicates with the first said recess and that is in register with said first sensor, wherein said shielding has a second opening at the opposite end thereof in register with said second recess and in register with said second sensor, wherein a cover closes said second opening, and wherein approximately the same amounts of said second type of radiation can pass through the first said opening and through said second opening and said cover.

5. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said shielding has an opening therein in register with said first sensor that permits said predetermined type of radiation to reach said first sensor, wherein a lens closes said opening, and wherein said lens readily transmits said predetermined type of radiation.

6. The detector as recited in claim 5 wherein said predetermined type of radiation is ultraviolet radiation.

7. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said first sensor is a photo-emissive tube of the avalanche type and is sensitive to proton radiation and to ultraviolet radiation, wherein said second sensor is a photo-emissive tube of the avalanche type and is sensitive to proton radiation and to ultrviolet radiation, wherein said predetermined radiation is ultraviolet radiation, and wherein said second type of radiation is proton radiation.

8. A detector for a predetermined type of radiation which can operate in the presence of a second type of radiation and which comprises a first sensor that is sensitive to said predetermined type of radiation and also to said second type of radiation, a second sensor which is sensitive to said second type of radiation, shielding for said first and second sensors which limits the amount of said second type of radiation that can reach said first and second sensors, said shielding permitting said predetermined type of radiation to reach said first sensor, and circuitry connected to said sensors which determines the difference between the amount of radiation received by said first sensor and the amount of radiation received by said second sensor, and thereby determines the amount of said predetermined type of radiation that is received by said first sensor; wherein said circuitry has a delay circuit which has the output thereof connected to a first output of said circuitry and which keeps said circuitry from developing a signal at said first output of said circuitry until said first sensor has received a preset minimum amount of said predetermined type of radiation for a pre-set minimum length of time, wherein said circuitry has a selectively actuatable means which has the output thereof connected to a second output of said circuitry and which has first input thereof connected to said first output of said circuitry, wherein said circuitry has a storage circuit connected to a second input of said selectively actuatable means, wherein said selectively actuatable means requires simultaneous signals from said storage circuit and from said first output of said circuitry at said second and first inputs thereof, respectively, and wherein said storage circuit can make certain that said selectively actuatable means is actuated every time said delay circuit permits said circuitry to develop a signal at said first output thereof and thus at said first input of said selectively actuatable means.

* * * * *